United States Patent [19]

Pearson et al.

[11] Patent Number: 5,400,418
[45] Date of Patent: Mar. 21, 1995

[54] POLARIZATION INDEPENDENT ALL-FIBER OPTICAL CIRCULATOR

[75] Inventors: Gary W. Pearson; Jerzy S. Krasinski, both of Stillwater; Philip E. Baker, Tulsa, all of Okla.

[73] Assignees: Williams Telecommunication Group, Inc., Tulsa; Board of Regents for Oklahoma State University, Stillwater, both of Okla.

[21] Appl. No.: 986,150
[22] Filed: Dec. 4, 1992
[51] Int. Cl.[6] .......................... G02B 5/30; G02F 1/29
[52] U.S. Cl. .................................. 385/11; 385/6; 385/42; 359/484; 359/489; 359/281
[58] Field of Search ................. 385/11, 6, 31, 32, 41, 385/42, 39; 359/484, 489, 497, 499, 281, 324

[56] References Cited

U.S. PATENT DOCUMENTS

| | | | |
|---|---|---|---|
| 3,536,375 | 10/1970 | Mansell | 350/157 |
| 4,464,022 | 8/1984 | Emkey | 359/484 |
| 4,557,553 | 12/1985 | McLandrich | 359/127 |
| 4,609,257 | 9/1986 | Shirasaki | 359/283 |
| 4,650,289 | 3/1987 | Kuwahara | 359/484 |
| 4,671,621 | 6/1987 | Dillon, Jr. et al. | 359/281 |
| 4,685,773 | 8/1987 | Carlsen et al. | 359/495 |
| 4,753,497 | 6/1988 | Fujii et al. | 385/42 |
| 4,783,851 | 11/1988 | Inou et al. | 359/166 |

(List continued on next page.)

FOREIGN PATENT DOCUMENTS 0522843 1/1993 European Pat. Off. .

OTHER PUBLICATIONS

Stolen et al, "Faraday rotation in highly birefringent optical fibers", Appliedoptics, vol. 19, No. 6, 15 Mar. 1980, pp. 842–845.

Fujii, Yohji, "High-Isolation Polarization-Independent Optical Circulator Coupled with Single-Mode with Single-Mode Fibers", *Journal of Lightwave Technology*, vol. 9, No. 4, Apr. 1991, pp. 456–460.

Fujii, Yohji, "High14 Isolation Polarization-Independent Optical Circulator", *Journal of Lightwave Technology*, vol. 9, No. 10, Oct., 1991, pp. 1238–1243.

Iwamura, Hidetoshi, et al., "Simple Polarisation-Independent Optical Circulator for Optical Transmission Systems", *Electronics Letters*, Dec. 6, 1979, vol. 15, No. 25, pp. 830–831.

Mizumoto, T., et al., "Verification of Waveguide-Type Optical Circulator Operation", *Electronic Letters*, Feb. 1, 1990, vol. 26, No. 3.

Okamura, Yasuyuki, et al., "Integrated Optical Isolator and Circulator Using Nonreciprocal Phase Shifters: A Proposal", *Applied Optics*, vol. 23, No. 11, Jun. 1, 1984, pp. 1886–1889.

Shirasaki, Masataka, et al., "A Compact Polarization-Independent Optical Circulator", *Applied Optics*, Aug. 1, 1981, vol. 20, No. 15, pp. 2683–2687.

(List continued on next page.)

*Primary Examiner*—Rodney B. Bovernick
*Assistant Examiner*—Hemang Sanghavi

[57] ABSTRACT

There is provided an optical circulator (16) for bidirectional communication on a fiber optic communication transmission system. Polarization preserving single-mode fiber lengths (26), (28) connect all-fiber polarization splitter (18) with the Faraday single-mode fiber lengths (22), (24). Polarization preserving single-mode fiber lengths (30), (32) connect the opposite ends of Faraday single-mode fiber lengths (22), (24) with all-fiber polarization splitter (20). A communication transmitter is connected to splitter (18) at port 1, and a communication receiver is connected to splitter (18) at port 3. A fiber optic communication link (50) is connected to splitter (20) at port 2. The components of optical circulator (16) cooperate such that light transmitted into port 1 exits from port 2, and light transmitted into port 2 exits from port 3.

29 Claims, 3 Drawing Sheets

U.S. PATENT DOCUMENTS

| | | | |
|---|---|---|---|
| 4,859,014 | 8/1989 | Schmitt et al. | 385/11 |
| 4,969,717 | 11/1990 | Mallinsoh | 359/39 |
| 4,973,119 | 11/1990 | Taki | 385/130 |
| 4,973,120 | 11/1990 | Jopson et al. | 385/50 |
| 4,973,124 | 11/1990 | Kaede | 385/27 |
| 4,974,944 | 12/1990 | Chang | 359/497 |
| 4,978,189 | 12/1990 | Blonder et al. | 385/35 |
| 4,987,567 | 1/1991 | Buhrer | 359/127 |
| 4,988,170 | 1/1991 | Burher | 359/497 |
| 5,031,983 | 7/1991 | Dillon, Jr. et al. | 385/11 |
| 5,033,830 | 7/1991 | Jameson | 359/484 |
| 5,303,314 | 4/1994 | Duling, III et al. | 385/11 |

OTHER PUBLICATIONS

Turner, E. H., et al., "Fiber Faraday Circulator or Isolator", *Optics Letters*, vol. 6, No. 7, Jul., 1981, pp. 322–323.

Yokohama, I., et al., "Fibre–Optic Polarising Beam Splitter Employing Birefringent–Fibre Coupler", *Electronics Letter*, May 9, 1985, vol. 21, No. 10, pp. 415–416.

Yokohama, I., et al, "Polarisation–Independent Optical Circulator Consisting of Two Fibre-Optic Polarising Beam Splitters and Two Yig Spherical Lenses", *Electronics Letters*, Mar. 26, 1986, vol. 22, No. 7, pp. 370–372.

POLARIZATION INDEPENDENT ALL-FIBER OPTICAL CIRCULATOR

TECHNICAL FIELD OF THE INVENTION

The present invention relates to optical circulators, and more particularly to a polarization independent all-fiber optical circulator for permitting bidirectional communication on a fiber optic communication transmission system.

BACKGROUND OF THE INVENTION

A practical way to double the bit carrying capacity of an existing unidirectional fiber optic communication link is by the use of optical circulators. An optical circulator is a passive, nonreciprocal device which permits full duplex communication on a single fiber optic link. Thus, a typical fiber optic communication link operating on two fibers can be quickly and economically converted to a bidirectional, single fiber communication link by installing an optical circulator at each end of the link.

FIG. 1 illustrates in block diagram form the operation of an optical circulator. From a block diagram point of view, the optical circulator can be viewed as a three-port device, having ports 1, 2, and 3. Light that enters port 1 exits the optical circulator at port 2. However, light that enters the optical circulator at port 2 exits at port 3. The fact that an optical circulator treats light moving in different directions differently makes it a non-reciprocal device. Though various designs are possible, the most commonly used component which gives a bulk optics circulator its non-reciprocity is a Faraday rotator.

FIG. 2 illustrates, in block diagram form, how a pair of optical circulators can be used to provide simultaneous, bidirectional communication on a single fiber optic link. Optical circulators 10 and 12, each having ports 1, 2, and 3, are installed at opposite ends of fiber optic link 14. For each optical circulator 10 and 12, a communication transmitter is located at port 1, the fiber is connected to port 2, and a communication receiver is located at port 3. In this manner, light emitted from each transmitter is launched onto fiber link 14 from opposite ends in opposite directions. At the end of each respective path, optical circulators 10 and 12 separate incoming signals from outgoing signals, so that the transmitters and receivers do not interfere with each other.

One of the major advantages of optical circulators over more traditional 3 dB couplers is that the loss penalty is much lower. Using a 3 dB coupler at each end of a fiber link, there is a guaranteed insertion loss of at least 6 dB. For connections which operate near their detection limits, this additional 6 dB loss could make bidirectional communication unworkable.

In a real optical circulator, three important considerations are insertion loss, cross-talk, and coupling loss. Insertion loss is the difference in power between light launched into the optical circulator and the power that exits the device. Insertion loss is primarily due to absorption of light and to imperfect polarization separation.

Cross-talk in an optical circulator refers to the amount of power emitted at port 3 (to the receiver) from light entering at port 1 (from the transmitter). Cross-talk is represented in FIG. 1 by the dashed line from port 1 to port 3. Due to fiber losses, the near end transmitter of a fiber optic communication system is generating much higher power levels than the near end receiver would normally see from the far end transmitter. If cross-talk is too high, the coupling of power from transmitter 1 into receiver 1 in FIG. 2 will overpower the signal from distant transmitter 2 and make the optical circulator useless for telecommunications purposes.

The primary cause of cross-talk in optical circulators is back-reflection from the various optical elements in the device. Since the optical circulator 'steers' the light rays depending on the direction of the rays, light originally from the near end transmitter but back-reflected from certain surfaces in the device and fiber are treated exactly as if these rays originally came from the far end transmitter. In addition to cross-talk within the optical circulator itself, reflections from the devices used to couple the optical circulator to the fiber can also cause cross-talk. Thus, otherwise useable connections or devices in a unidirectional fiber link could cause major problems if used in a bidirectional link. Therefore splices and connectors, as well as the internal components of the optical circulator, should have back-reflections minimized.

It is worth noting that reflections from the communication receiver itself do not cause a cross-talk problem since an optical circulator is in fact a four port device. The fourth port is not used in a bidirectional communication system, and therefore back-reflections from the receiver are propagated to port 4 where they are lost to free space or to an absorbing material.

Coupling losses arise from absorption, reflection, or stimulation of radiating modes in the fiber which may occur at a connection or splice between fiber strands, or between an optical fiber and an optical device. Like insertion losses and cross-talk, coupling losses, if not minimized, can make bidirectional fiber optic communication unworkable.

Prior art optical circulators are described in U.S. Pat. No. 4,650,289, issued to Kuwahara; U.S. Pat. No. 4,464,022, issued to Emkey; and in U.S. Pat. No. 4,859,014, issued to Schmitt et al. However, insertion loss and/or cross-talk in optical circulators made as described in these references are unacceptably high for many communications applications. Therefore, a need exists for an optical circulator having lower insertion loss and cross-talk than that found in present optical circulators. Such an optical circulator will preferably comprise entirely optical fiber which can be fusion spliced into a fiber optic communication system, thus avoiding coupling losses associated with traditional designs.

SUMMARY OF THE INVENTION

The optical circulator of the present invention comprises a pair of Faraday single-mode fiber links, first and second polarization splitters, and first, second, third, and fourth pairs of polarization preserving single-mode fiber links.

The Faraday single-mode fiber links each has a first end and a second end. Each of the first pair of polarization preserving single-mode fiber links has a first end joined to a first end of a different Faraday fiber link. The first polarization splitter has a first end joined to a second end of each of the first pair of polarization preserving single-mode fiber links. Each of the second pair of polarization preserving single-mode fiber links has a first end joined to a second end of the first polarization splitter, and a second end terminating in first and third fiber optic communication ports, respectively.

Each of the third pair of polarization preserving single-mode fiber links has a first end joined to a second end of a different Faraday fiber link. The second polarization splitter has a first end joined to a second end of each of the third pair of polarization preserving single-mode fiber links. Each of the fourth pair of polarization preserving single-mode fiber links has a first end joined to a second end of the second polarization splitter, and a second end terminating in second and fourth fiber optic communication ports, respectively.

BRIEF DESCRIPTION OF THE DRAWINGS

For a more complete understanding of the present invention and the advantages thereof, reference is now made to the following detailed description taken in conjunction with the accompanying drawings, in which.

DETAILED DESCRIPTION OF THE INVENTION

Figure 1:
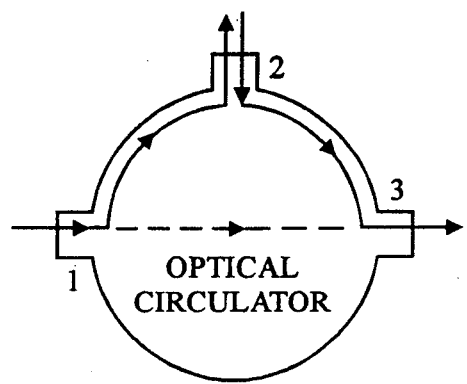
FIG. 1 is a simplified illustration of the operation of an optical circulator.
Figure 2:
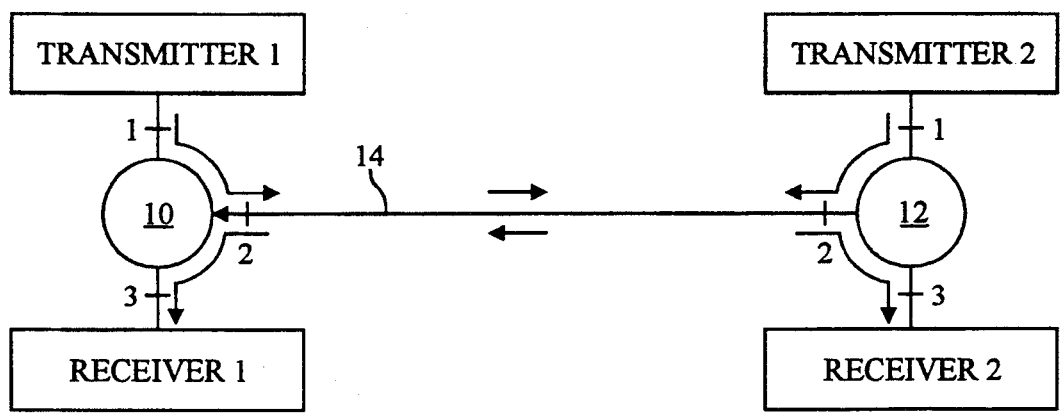
FIG. 2 is a block diagram representation of a bidirectional communication system utilizing an optical circulator at each end of a single fiber optic link.

The preferred embodiment of the present invention and its advantages are best understood by referring to the drawings, like numerals being used for like and corresponding parts of the various drawings.

Figure 3:
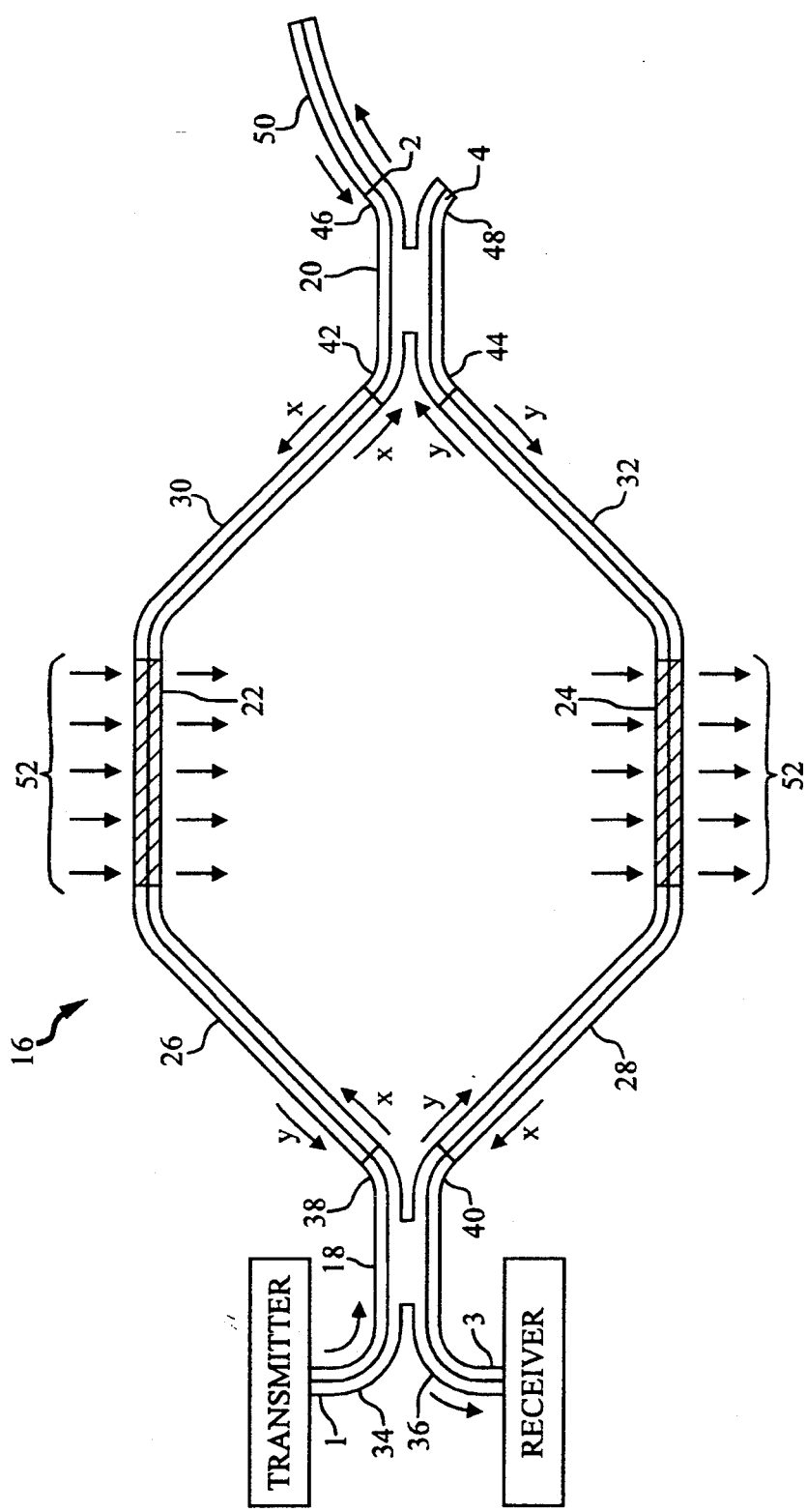
FIG. 3 is a diagrammatic view of the all-fiber optical circulator of the present invention, showing the paths of light rays from a transmitter to the fiber, and from the fiber to a receiver.

Referring to FIG. 3, there is shown a diagrammatic view of an optical circulator, generally designated 16, according to a first embodiment of the present invention, as it might be used in a bidirectional fiber optic communication system. Optical circulator 16 comprises a pair of all-fiber polarization splitters 18 and 20, lengths of Faraday single-mode fiber 22 and 24, lengths of polarization preserving single-mode fiber 26, 28, 30, and 32, and a magnet (not illustrated). All-fiber polarization splitter 18 has pigtails 34 and 36 on one end and pigtails 38 and 40 on the opposite end. Pigtail 34 is connected to a fiber optic communication transmitter, and pigtail 36 is connected to a fiber optic communication receiver. On the opposite end of all-fiber polarization splitter 18, pigtail 38 is fusion spliced to polarization preserving single-mode fiber length 26, and pigtail 40 is fusion spliced to polarization preserving single-mode fiber length 28. The opposite ends of polarization preserving single-mode fiber lengths 26 and 28 are fusion spliced to Faraday single-mode fiber lengths 22 and 24, respectively. The ends of Faraday single-mode fiber lengths 22 and 24 opposite polarization preserving single-mode fiber lengths 26 and 28 are fusion spliced to polarization preserving single-mode fiber lengths 30 and 32, respectively. The ends of polarization preserving single-mode fiber lengths 30 and 32 opposite Faraday single-mode fiber lengths 22 and 24 are fusion spliced to pigtails 42 and 44 of all-fiber polarization splitter 20, respectively. On the opposite end of all-fiber polarization splitter 20, pigtail 46 is fusion spliced to fiber optic link 50. Pigtail 48 is not used in a bidirectional fiber optic communication system.

Optical circulator 16 is a four port device. Port 1 is at the outer end of pigtail 34 of all-fiber polarization splitter 18, where the transmitter is located. Port 2 is at the outer end of pigtail 46 of all-fiber polarization splitter 20, where fiber optic link 50 is connected. Port 3 is at the outer end of pigtail 36 of all-fiber polarization splitter 18, where the receiver is located. Port 4 is at the outer end of pigtail 48 of all-fiber polarization splitter 20.

All-fiber polarization splitters 18 and 20 are commercially available, and well known in the art of fiber optic communications. For example, the polarization splitters sold as Product Codes 918P and 919PY by Canadian Instrumentation and Research, Ltd., Ontario, Canada, may be used for all-fiber polarization splitter 18 and 20. All-fiber polarization splitters 18 and 20 each comprise a pair of polarization preserving single-mode fiber strands which have been fused together and tapered so that their respective cores are lying in close contact. The function of splitters 18 and 20 in this invention is explained more fully below.

Polarization preserving single-mode fiber suitable for use in this invention is commercially available as model number F-SPS from Newport Klinger Co., Fountain Valley, Calif. Model F-SPS fiber is suitable for use at operating frequencies of 1300 and 1500 nm. Non-polarization preserving single-mode fiber, used in an alternative embodiment of this invention, is available as model number F-SS from Newport Klinger Co. Model F-SS fiber is suitable for use at operating frequencies of 1300 and 1550 nm.

Faraday single-mode fiber comprises polarization preserving single-mode fiber which has been doped with terbium or other rare earth element to impart a polarization rotation to light traversing the fiber within a magnetic field. Faraday single-mode fiber has a relatively large Verdet constant. The Verdet constant is the ratio of polarization rotation to length of fiber propagated for a given magnetic field.

In optical circulation 16, polarization preserving single-mode fiber lengths 26 and 30 are axially twisted a combined total of 45° clockwise, measured from the outer end of fiber length 26 to the outer end of fiber length 30. Alternatively, the combined twist in fiber lengths 26 and 30 can be 45° plus or minus any multiple of 180°, or 45°±n180° where n is any integer ≧0. This combined 45°±n180° twist can be entirely in fiber length 26, entirely in fiber length 30, or can be split between fiber lengths 26 and 30 in any proportion, so long as the combined twist in both fiber lengths 26 and 30 is 45°±n180°. Preferably, for simplicity of manufacture, each fiber length 26 and 30 is twisted 22.5° clockwise.

Similarly, polarization preserving single-mode fiber lengths 28 and 32 are axially twisted a combined total of 45°±n180° clockwise, measured from the outer end of fiber length 28 to the outer end of fiber length 32. As with fiber lengths 26 and 30, the combined 45°±n180° twist can be split between lengths 28 and 32 in any proportion, but preferably each length 28 and 32 is twisted 22.5° clockwise.

A magnet (not illustrated) is used to create a strong magnetic field 52 around Faraday single-mode fiber lengths 22 and 24. Magnetic field 52 is adjusted to provide 45° nonreciprocal polarization rotation to linearly polarized light traversing fiber lengths 22 and 24 in opposite directions. The strength of magnetic field 52 required to accomplish this rotation will depend on the lengths and materials of fibers 22 and 24, and on the wavelength of the light used.

Optical circulator 16 operates in the following manner when used in a bidirectional fiber optic communication system: A fiber optic communication transmitter emits a beam of randomly polarized light into all-fiber polarization splitter 18 at port 1, as indicated in FIG. 3. Polarization splitter 18 divides the randomly polarized beam into two paths, one for each of two orthogonal, linearly polarized states of light. For purposes of this description, this first linearly polarized state, denoted x-polarized light, is assumed to be polarized in the plane of FIG. 3. The second, orthogonal linearly polarized state, denoted y-polarized light, is assumed to be polarized perpendicular to the plane of FIG. 3. Assume further that polarization splitters 18 and 20 are configured such that x-polarized light remains in the fiber of splitter 18 or 20 in which it enters, while y-polarized light cross-coupled from one fiber to the other within the splitter. Thus, the x-polarized light exits splitter 18 through pigtail 38, and the y-polarized light exits through pigtail 40.

The 22.5° clockwise axial twist in fiber length 26 imparts a 22.5° clockwise polarization rotation to the x-polarized light traversing it. Similarly, the 22.5° clockwise axial twist in fiber length 28 imparts a 22.5° clockwise polarization rotation to the y-polarized light traversing it. For purposes of this description, the direction of polarization rotation is measured with respect to the direction of propagation of the light.

Assume that magnetic field 52 surrounding Faraday single-mode fiber lengths 22 and 24 is adjusted to impart a 45° counter-clockwise polarization rotation to light traversing fiber lengths 22 and 24 from left to right. The previously x-polarized light will therefore exit fiber length 22 with a net polarization rotation of 22.5° counter-clockwise (22.5° clockwise rotation in fiber length 26 plus 45° counter-clockwise rotation in fiber length 22). Similarly, the previously y-polarized light will exit fiber length 24 with a net polarization rotation of 22.5° counter-clockwise.

The 22.5° clockwise axial twist in fiber lengths 30 and 32 impart a 22.5° clockwise polarization rotation to the light traversing fiber lengths 30 and 32, respectively. This 22.5° clockwise polarization rotation cancels the net 22.5° counter-clockwise rotations previously imparted. Hence, the x-polarized light exiting polarization splitter 18 remains x-polarized as it enters polarization splitter 20 through pigtail 42, and the y-polarized light exiting polarization splitter 18 remains y-polarized as it enters polarization splitter 20 through pigtail 44.

The x-polarized light which enters pigtail 42 of polarization splitter 20 remains in the upper fiber and exits through pigtail 46. The y-polarized light, on the other hand, is cross-coupled from the lower fiber to the upper fiber, and also exits polarization splitter 20 through pigtail 20. The x-polarized and y-polarized light are recombined in pigtail 46 of polarization splitter 20. The recombined beams thus enter fiber optic link 50 at port 2 as a single beam of randomly polarized light.

FIG. 3 also illustrates the path of a beam of randomly polarized light entering port 2 of optical circulator 16 from fiber optic link 50. Polarization splitter 20 divides the randomly polarized light into two paths, one for x-polarized and one for y-polarized light. As previously described, the x-polarized light entering pigtail 46 of all-fiber polarization splitter 20 remains in the upper fiber and exits through pigtail 42. The y-polarized light, on the other hand, is cross-coupled to the lower fiber and exits through pigtail 44.

The 22.5° clockwise axial twist in fiber lengths 30 and 32 impart a 22.5° clockwise polarization rotation to the x-polarized light traversing fiber length 30, and to the y-polarized light traversing fiber length 32.

Being non-reciprocal, Faraday single-mode fiber lengths 22 and 24 within magnetic field 52 rotate the polarization of light traversing them from right to left in the opposite direction from that of light passing from left to right. Faraday single-mode fiber lengths 22 and 24 thus impart an additional 45° clockwise polarization rotation to the light traversing them. The 22.5° clockwise axial twist in fiber lengths 26 and 28 impart an additional 22.5° clockwise polarization rotation to the light traversing fiber lengths 26 and 28, respectively. Thus, the previously x-polarized light will exit fiber length 26 with a net polarization rotation of 90° clockwise (22.5° clockwise rotation in each of fiber lengths 26 and 30 plus 45° clockwise rotation in Faraday fiber length 22). This 90° polarization rotation converts the previously x-polarized light to y-polarized light. Similarly, the previously y-polarized light will exit fiber length 28 with a net 90° polarization rotation, converting it to x-polarized light.

The now x-polarized light which enters pigtail 40 of polarization splitter 18 from fiber length 28 remains in the lower fiber and exits through pigtail 36. The now y-polarized light which enters pigtail 38 from fiber length 26, on the other hand, is cross-coupled from the upper fiber to the lower fiber, and also exits through pigtail 36. The x-polarized and y-polarized light are recombined in pigtail 36, and enter the receiver at port 3 as a single beam of randomly polarized light.

Thus, as a passive, non-reciprocal device, all-fiber optical circulator 16 directs light to or from a different port depending on the direction of propagation. Light entering port 1 from the transmitter exits at port 2 to fiber link 50. Light entering port 2 from fiber link 50 exits at port 3 to the receiver. Port 4 is not used when optical circulator 16 is used in a bidirectional fiber optic communication system as described above.

As described above, the divided light beams passing through optical circulator 16 from the transmitter to fiber optic length 50 undergo a net 0° polarization rotation. Similarly, the divided light beams passing through optical circulator 16 from fiber optic length 50 to the receiver undergo a net 90° polarization rotation. It is to be observed, however, that optical circulator 16 will function as described above so long as the net polarization rotation imparted to the divided light beams passing from the transmitter to fiber optic length 50 is 0° plus any positive or negative multiple of 180° or $0° \pm n180°$ where $n \geq 0$. Further, the net polarization rotation imparted to the divided beams passing from fiber optic length 50 to the receiver can be 90° plus any positive or negative multiple of 180° or $90° \pm n180°$. The all-fiber optical circulator of the present invention is therefore not limited to the specific embodiment described above.

Figure 4:
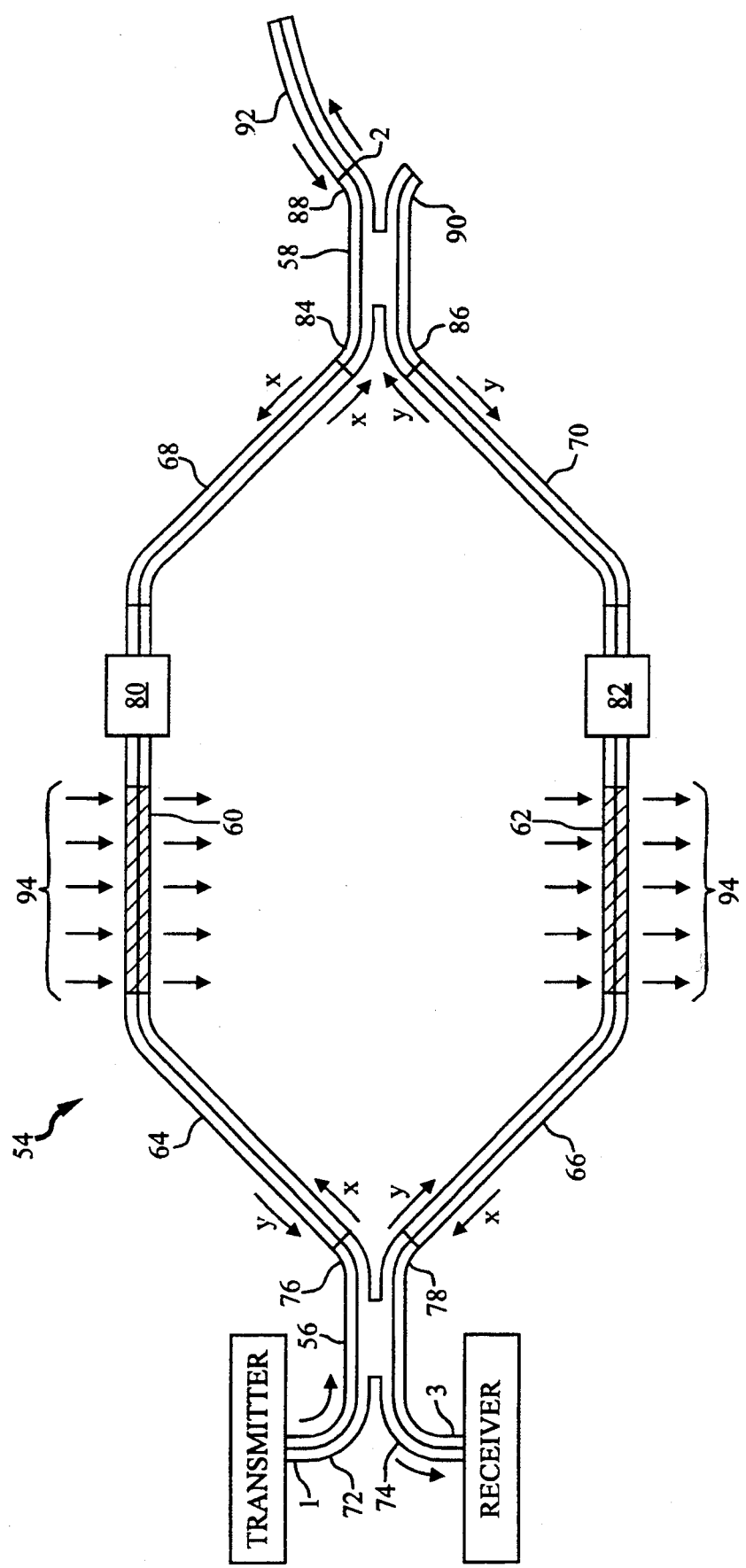
FIG. 4 is a diagrammatic view of an optical circulator according to an alternative embodiment of the present invention, showing the paths of light rays from a transmitter to the fiber, and from the fiber to a receiver.

Referring now to FIG. 4, there is shown a diagrammatic view of an optical circulator, generally designated 54, according to a second, alternative embodiment of the present invention, as it might be used in a bidirectional fiber optic communication system. Optical circulator 54 comprises a pair of all-fiber polarization splitters 56 and 58, a pair of polarization controllers 80 and 82, lengths of Faraday single-mode fiber 60 and 62, lengths of single-mode fiber 64, 66, 68, and 70, and a magnet (not illustrated). Polarization splitter 56 has pigtails 72 and 74 on one end and pigtails 76 and 78 on the opposite end.

Pigtail 72 is connected to a fiber optic communication transmitter, and pigtail 74 is connected to a fiber optic communication receiver. On the opposite end of polarization splitter 56, pigtail 76 is fusion spliced to single-mode fiber length 64, and pigtail 78 is fusion spliced to single-mode fiber length 66. The opposite ends of single-mode fiber lengths 64 and 66 are fusion spliced to Faraday single-mode fiber lengths 60 and 62, respectively. The ends of Faraday single-mode fiber lengths 60 and 62 opposite fiber lengths 64 and 66 are connected to first sides of polarization controllers 80 and 82, respectively. The second sides of polarization controllers 80 and 82 are connected to single-mode fiber lengths 68 and 70, respectively. The ends of single-mode fiber lengths 68 and 70 opposite polarization controllers 80 and 82 are fusion spliced to pigtails 84 and 86 of all-fiber polarization splitter 58, respectively. On the opposite end of polarization splitter 58, pigtail 88 is fusion spliced to fiber optic link 92. Pigtail 90 is not used in a bidirectional fiber optic communication system.

Optical circulator 54 is a four port device. Port 1 is at the outer end of pigtail 72 of polarization splitter 56, where the transmitter is located. Port 2 is at the outer end of pigtail 88 of polarization splitter 58, where fiber optic link 92 is connected. Port 3 is at the outer end of pigtail 74 of polarization splitter 56, where the receiver is located. Port 4 is at the outer end of pigtail 90 of polarization splitter 58.

All-fiber polarization splitters 56 and 58 are essentially identical to all-fiber polarization splitters 18 and 20 described above with reference to the first embodiment of this invention. Polarization splitters sold as Product Codes 918P and 919PY by Canadian Instrumentation and Research, Ltd., Ontario, Canada, may be used for all-fiber polarization splitters 56 and 58. Faraday single-mode fiber lengths 60 and 62 are essentially identical to Faraday single-mode fiber lengths 22 and 24 described above.

Polarization controllers 80 and 82 are commercially available, and well known in the art of fiber optics. For example, polarization controllers sold as Model Y-35-5276 by GEC Advanced Optical Products, West Hanningfield Road, Great Baddow, Chelmsford, Essex, England may be used for polarization controllers 80 and 82. The GEC Model Y-35-5276 polarization controller operates at wavelengths of 1.3 to 1.55 μm.

A magnet (not illustrated) is used to create a strong magnetic field 94 around Faraday single-mode fiber lengths 60 and 62. Magnetic field 94 is adjusted to provide 45° nonreciprocal polarization rotation to linearly polarized light traversing fiber lengths 60 and 62 in opposite directions. The strength of magnetic field 94 required to accomplish this rotation will depend on the lengths and materials of fibers 60 and 62, and on the wavelength of the light used.

Optical circulator 54 operates in the following manner when used in a bidirectional fiber optic communication system: A fiber optic communication transmitter emits a beam of randomly polarized light into polarization splitter 56 at port 1, as indicated in FIG. 4. Polarization splitter 56 divides the randomly polarized beam into two paths, one for x-polarized light, and the other for y-polarized light. Assume that polarization splitters 56 and 58 are configured such that x-polarized light remains in the fiber of splitter 56 or 58 in which it enters, while y-polarized light is cross-coupled from one fiber to the other within the splitter. Thus, the x-polarized light exits splitter 56 through pigtail 76, and the y-polarized light exits through pigtail 78. The x-polarized light is conveyed by single-mode fiber length 64 to Faraday single-mode fiber length 60. Similarly, the y-polarized light is conveyed by single-mode fiber length 66 to Faraday single-mode fiber length 66.

Assume that magnetic field 94 surrounding Faraday fiber lengths 60 and 62 is adjusted to impart a 45° counter-clockwise polarization rotation to light traversing fiber lengths 60 and 62 from left to right. The previously x-polarized and y-polarized light will therefore exit fiber lengths 60 and 62, respectively, with their polarizations rotated 45° counter-clockwise. Assume further that polarization controllers 80 and 82 are adjusted to impart a reciprocal 45° clockwise polarization rotation to light traversing them. The 45° clockwise polarization rotation in controllers 80 and 82 cancels the 45° counter-clockwise rotation previously imparted. Hence, the x-polarized light exiting polarization splitter 56 remains x-polarized as it enters polarization splitter 58 through single-mode fiber length 68, and the y-polarized light exiting polarization splitter 56 remains y-polarized as it enters polarization splitter 58 through single-mode fiber length 70.

The x-polarized light which enters pigtail 84 of polarization splitter 58 remains in the upper fiber and exits through pigtail 88. The y-polarized light, on the other hand, is cross-coupled from the lower fiber to the upper fiber, and also exits splitter 58 through pigtail 88. The x-polarized and y-polarized light are recombined in pigtail 88 of splitter 58. The recombined beams thus enter fiber optic link 92 at port 2 as a single beam of randomly polarized light.

FIG. 4 also illustrates the path of a beam of light entering port 2 of optical circulator 54 from fiber optic link 92. Polarization splitter 58 divides the randomly polarized light into two paths, one for x-polarized and one for y-polarized light. As previously described, the x-polarized light entering pigtail 88 of polarization splitter 58 remains in the upper fiber and exits through pigtail 84. The y-polarized light, on the other hand, is cross-coupled to the lower fiber and exits through pigtail 86.

Being a reciprocal optical element, polarization controller 80 imparts a 45° clockwise polarization rotation to the x-polarized light traversing it. Similarly, polarization controller 82 imparts a 45° clockwise polarization rotation to the y-polarized light traversing it.

Being non-reciprocal, Faraday single-mode fiber lengths 60 and 62 within magnetic field 94 rotate the polarization of light traversing them from right to left in the opposite direction from that of light passing from left to right. Faraday fiber lengths 60 and 62 thus impart an additional 45° clockwise polarization rotation to the light traversing them. Thus, the previously x-polarized light will exit fiber length 60 with a net polarization rotation of 90° clockwise (45° clockwise rotation in polarization controller 80 plus 45° clockwise rotation in fiber length 60). This 90° polarization rotation converts the previously x-polarized light to y-polarized light. Similarly, the previously y-polarized light will exit Faraday fiber length 62 with a net 90° polarization rotation, converting it to x-polarized light.

The now x-polarized light is conveyed by single-mode fiber length 66 to pigtail 78 of polarization splitter 56, and the now y-polarized light is conveyed by single-mode fiber length 64 to pigtail 78 of polarization splitter 56. As previously described, the x-polarized light remains in the lower fiber of polarization splitter 56 and exits through pigtail 74. The y-polarized light, on the other hand, is cross-coupled from the upper fiber to the lower fiber, and also exits through pigtail 74. The x-polarized and y-polarized light are recombined in pigtail 74, and enter the receiver at port 3 as a single beam of randomly polarized light.

Thus, optical circulator 54 of the second embodiment of this invention is the functional equivalent of optical circulator 16 of the first embodiment: Light entering port 1 from the transmitter exits at port 2 to fiber link 92, and light entering port 2 from fiber link 92 exits at port 3 to the receiver. Port 4 is not used when optical circulator 54 is used in a bidirectional fiber optic communication system. As with optical circulator 16 of the first embodiment of this invention, the net polarization rotation imparted to the divided outgoing light beams can alternatively be any positive or negative multiple of 180°, or 0°±n180°. Similarly, the net polarization rotation imparted to the divided incoming beams can be 90°±n180°.

An additional embodiment of optical circulator 54 can be constructed without the use of Faraday single-mode fiber at all. Because Faraday polarization rotation can be achieved in single-mode silica fiber exposed to a strong magnetic field, Faraday single-mode fiber lengths 60 and 62 can be replaced by single-mode fiber lengths. Magnetic field 94 will still be required. It should be noted, however, that for a given magnetic field strength, much longer lengths of single-mode fiber will be required to achieve the same degree of polarization rotation that can be achieved in a relatively short length of Faraday single-mode fiber. This is true because ordinary silica fiber has a much lower Verdet constant than Faraday single-mode fiber.

It should be noted that optical circulators 16 and 54 are both four part devices. By an analysis similar to that described above, it can be shown that light which enters optical circulators 16 and 54 at port 3 will exit at port 4, and light that enters at port 4 will exit at port 1.

Figure 5:
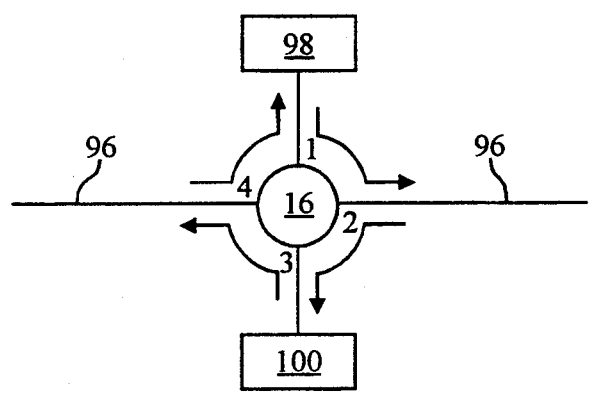
FIG. 5 is a block diagram representation of a bidirectional communication system utilizing an optical circulator of the present invention to provide amplification.

FIG. 5 illustrates an alternative application in which all four ports of optical circulator 16 are used to provide amplification in a bidirectional fiber optic communication link. Adjacent ends of fiber optic link 96 are fusion spliced to ports 2 and 4 of optical circulator 16. Optical amplifiers 98 and 100 are located at ports 1 and 3, respectively. Light passing from left to right along fiber optic link 96 enters port 4 of optical circulator 16, and exits at port 1, where it enters optical amplifier 98. The amplified light reenters optical circulator 16 at port 1, and exits at port 2, where it again proceeds along fiber optic link 96 from left to right. Light passing from right to left along fiber optic link 96 enters port 2 of optical circulator 16, and exits at port 3, where it enters optical amplifier 100. The amplified light reenters optical circulator 16 at port 3, and exits at port 4, where it again proceeds along fiber optic link 96 from right to left.

It should also be observed that optical circulator 16 or 54 can alternatively be used as an optical isolator. An optical isolator can be viewed as a 2-port device. Light which enters port 1 of the optical isolator exits at port 2, as in an optical circulator. However, light which enters port 2 is absorbed by a light absorbing material, and goes nowhere. Referring again to FIGS. 3 and 4, simply replacing the communication receiver at port 3 with a light absorbing material will convert optical circulator 16 or 54 into an optical isolator.

Several factors contribute to lower insertion losses, coupling losses, and cross-talk in optical circulators 16 and 54 of the present invention than in prior optical circulators. First, single-mode silica fiber has a much lower absorption coefficient for light at communications frequencies than do traditional Faraday rotator materials, such as YIG crystal and Hoya glass. Admittedly, single-mode silica fiber has a lower Verdet constant than traditional Faraday rotator materials. However, the much lower absorption coefficient for single-mode silica fiber more than offsets the lower Verdet constant, when compared to YIG crystal. The figure of merit for a Faraday rotator is defined as: $M=V/\alpha$, where V is the Verdet constant and $\alpha$ is the absorption coefficient. Single-mode silica fiber has a higher figure of merit than does YIG crystal at standard telecommunications wavelengths of 1.3 and 1.55 microns. This simply reflects that fact that although a longer length of silica fiber than YIG crystal is required to achieve a given degree of polarization rotation, less light is absorbed, even in the longer length. The reduced light absorption achieved with single-mode silica fiber reduces insertion loss in the all-fiber optical circulator of this invention.

Coupling losses are avoided in the all-fiber optical circulator because traditional coupling optics are replaced by fusion splices of optical fiber, and because the light remains entirely within fiber as it passes through the optical circulator.

Cross-talk is reduced in the all-fiber optical circulator of the present invention because the various components are integral with one another, and sources of back reflection are largely eliminated. Back reflection is much higher in optical circulators having discrete, physically separated optical components.

The all-fiber optical circulator of this invention is more adaptable to field implementation than prior optical circulators because it can withstand dirty or dusty environments and shock or vibration.

The present invention, and many of its intended advantages, will be understood from the foregoing description and it will be apparent that, although the invention and its advantages have been described in detail, various changes, substitutions and alterations may be made in the manner, procedure, and details thereof without departing from the spirit and scope of the invention, as defined by the appended claims, or sacrificing all of its material advantages, the form hereinbefore described being merely a preferred or exemplary embodiment thereof.

What is claimed is:

1. An optical circulator, comprising:
   a pair of Faraday single-mode fiber links, each Faraday fiber link having a first end and a second end;

a first pair of polarization preserving single-mode fiber links, each having a first end joined to a first end of a different Faraday fiber link;

a first polarization splitter having a first end joined to a second end of each of the first pair of polarization preserving single-mode fiber links, and a second end terminating in first and third fiber optic communication ports, respectively;

a second pair of polarization preserving single-mode fiber links, each having a first end joined to a second end of a different Faraday fiber link; and a second polarization splitter having a first end joined to a second end of each of the second pair of polarization preserving single-mode fiber links, and a second end terminating in second and fourth fiber optic communication ports, respectively.

2. The optical circulator of claim 1, wherein the pair of Faraday single-mode fiber links are exposed to a magnetic field such that the Faraday fiber links impart a polarization rotation to light traversing the Faraday fiber links in a first direction, and a different rotation to light traversing the Faraday fiber links in a second, opposite direction.

3. The optical circulator of claim 2, wherein the polarization rotation imparted to light traversing the Faraday fiber links in the first direction differs by 90° from the polarization rotation imparted to light traversing the links in the opposite direction.

4. The optical circulator of claim 1, wherein one or more of the first and second pairs of polarization preserving single-mode fiber links are axially twisted such that the twisted links impart a polarization rotation to light traversing the links, the polarization rotation imparted to light traversing the twisted links in a first direction being equal to the polarization rotation imparted to light traversing the twisted links in a second, opposite direction.

5. The optical circulator of claim 4, wherein the twisted polarization preserving single-mode fiber links joined to each end of either of the Faraday single-mode fiber links together impart a 45° polarization rotation to light traversing the links from one polarization splitter to the other.

6. The optical circulator of claim 4, wherein the Faraday single-mode fiber links, the axially twisted polarization preserving single-mode fiber links, and the polarization splitters cooperate to reverse the linear polarization of light passing from the first polarization splitter to the second polarization splitter, and to leave unchanged the linear polarization of light passing from the second polarization splitter to the first polarization splitter.

7. The optical circulator of claim 1, wherein the Faraday single-mode fiber links comprise silica doped with a substance that substantially increases the Verdet constant of the fiber.

8. The optical circulator of claim 1, further including a single, light-transmissive fiber link for fiber optic communication, wherein the Faraday single-mode fiber links and the polarization preserving single-mode fiber links cooperate to convey light transmitted into the first communication port to the second communication port, and further cooperate to convey light transmitted into the second communication port to the third communication port, whereby the optical circulator permits bi-directional fiber optic communication on the single fiber link.

9. The optical circulator of claim 1, wherein the Faraday single-mode fiber links and the polarization preserving single-mode fiber links cooperate to convey light transmitted into the first port to the second port, to convey light transmitted into the second port to the third port, to convey light transmitted into the third port to the fourth port, and to convey light transmitted into the fourth port to the first port.

10. An optical circulator, comprising:

a pair of Faraday single-mode fiber links, each Faraday fiber link having a first and a second end;

a first pair of polarization preserving single-mode fiber links, each having a first end joined to a first end of a different Faraday fiber link, and each having an axial twist along its length;

a first all-fiber polarization splitter having a first end joined to a second end of each of the first pair of polarization preserving single-mode fiber links, and a second end terminating in first and third fiber optic communication ports, respectively;

a second pair of polarization preserving single-mode fiber links, each having a first end joined to a second end of a different Faraday fiber link, and each having an axial twist along its length;

a second all-fiber polarization splitter having a first end joined to a second end of each of the second pair of polarization preserving single-mode fibers, and a second end terminating in second and fourth fiber optic communication ports, respectively; and at least one magnet disposed near the Faraday fiber links for creating a magnetic field surrounding the Faraday fiber links, such that the Faraday fiber links impart a polarization rotation to light traversing them which is dependent upon the direction of traversal of the light.

11. The optical circulator of claim 10, wherein the axially twisted polarization preserving single-mode fiber links joined to each end of either of the Faraday fiber links together impart a 45° polarization rotation to light traversing the links from one splitter to the other.

12. The optical circulator of claim 10, further including a single, light-transmissive fiber link for fiber optic communication, wherein the Faraday single-mode fiber links and the polarization preserving single-mode fiber links cooperate to convey light transmitted into the first communication port to the second communication port, and further cooperate to convey light transmitted into the second communication port to the third communication port, whereby the optical circulator permits bi-directional fiber optic communication on the single fiber link.

13. The optical circulator of claim 10, wherein the Faraday single-mode fiber links and the polarization preserving single-mode fiber links cooperate to convey light transmitted into the first port to the second port, to convey light transmitted into the second port to the third port, to convey light transmitted into the third port to the fourth port, and to convey light transmitted into the fourth port to the first port.

14. A method for providing bidirectional communication to and from a single light-transmissive fiber optic link, which comprises the steps of:

emitting an outgoing beam of randomly polarized light from a fiber optic communication transmitter;

dividing the outgoing beam in a first polarization splitter into two outgoing beams, one for each of two orthogonal, linearly polarized states of light;

passing each divided outgoing beam through one or more axially twisted links of polarization preserving single-mode fiber to rotate the polarization of light in each outgoing beam;

passing each divided outgoing beam through a Faraday single-mode fiber link in a magnetic field to rotate the polarization of light in each divided outgoing beam, whereby the polarization rotation occurring in the Faraday fiber link cancels the polarization rotation occurring in the polarization preserving fiber links and the polarization states of light in the divided outgoing beams remain unchanged after having passed through the Faraday fiber link and the polarization preserving fiber links;

recombining the divided outgoing beams in a second polarization splitter into a single outgoing beam of randomly polarized light;

transmitting the recombined outgoing beam into the fiber optic link;

emitting an incoming beam of randomly polarized light from the fiber optic link;

dividing the incoming beam in the second polarization splitter into two incoming beams, one for each of two orthogonal, linearly polarized states of light;

passing each divided incoming beam through one or more axially twisted links of polarization preserving single-mode fiber to rotate the polarization of light in each incoming beam;

passing each divided incoming beam through a Faraday single-mode fiber link in a magnetic field in a direction opposite that of the divided outgoing beams, to rotate the polarization of light in each divided incoming beam, whereby the polarization states of light in the divided incoming beams are completely reversed after having passed through the Faraday fiber link and the polarization-preserving fiber links;

recombining the divided incoming beams in the first polarization splitter into a single incoming beam of randomly polarized light; and transmitting the recombined incoming beams into a fiber optic communication receiver.

15. An optical circulator, comprising:
a pair of Faraday single-mode fiber links, each Faraday fiber link having a first end and a second end;
a first pair of single-mode fiber links, each having a first end joined to a first end of a different Faraday fiber link;
a first polarization splitter having a first end joined to a second end of each of the first pair of single-mode fiber links, and a second end terminating in first and third fiber optic communication ports, respectively;
a pair of polarization controllers, each having a first port connected to a second end of a different Faraday fiber link;
a second pair of single-mode fiber links, each having a first end joined to a second port of a different polarization controller; and
a second polarization splitter having a first end joined to a second end of each of the second pair of single-mode fiber links and a second end terminating in second and fourth fiber optic communication ports, respectively.

16. The optical circulator of claim 15, wherein the pair of Faraday single-mode fiber links are exposed to a magnetic field such that the Faraday fiber links impart a polarization rotation to light traversing the Faraday fiber links in a first direction, and a different rotation to light traversing the Faraday fiber links in a second, opposite direction.

17. The optical circulator of claim 16, wherein the polarization rotation imparted to light traversing the Faraday fiber links in the first direction differs by 90° from the polarization rotation imparted to light traversing the links in the opposite direction.

18. The optical circulator of claim 15, wherein each polarization controller imparts a polarization rotation to light traversing it, the polarization rotation imparted to light traversing the controller in a first direction being equal to the polarization rotation imparted to light traversing the controller in a second, opposite direction.

19. The optical circulator of claim 18, wherein the net polarization rotation imparted by each polarization controller and the single-mode fiber link joined to its second port and the single-mode fiber link joined to the Faraday single-mode fiber link connected to its first part equals 45°.

20. The optical circulator of claim 15, wherein the single-mode fiber links, the Faraday single-mode fiber links, the polarization controllers, and the polarization splitters cooperate to reverse the linear polarization of light passing from the first polarization splitter to the second polarization splitter, and to leave unchanged the linear polarization of light passing from the second polarization splitter to the first polarization splitter.

21. The optical circulator of claim 15, further including a single, light-transmissive fiber link for fiber optic communication, wherein the Faraday single-mode fiber links, the single-mode fiber links, and the polarization controllers cooperate to convey light transmitted into the first communication port to the second communication port, and further cooperate to convey light transmitted into the second communication port to the third communication port, whereby the optical circulator permits bi-directional fiber optic communication on the single fiber link.

22. A method for providing bidirectional communication to and from a single light-transmissive fiber optic link, which comprises the steps of:
emitting an outgoing beam of randomly polarized light from a fiber optic communication transmitter;
dividing the outgoing beam in a first polarization splitter into two outgoing beams, one for each of two orthogonal, linearly polarized states of light;
passing each divided outgoing beam through a polarization controller to rotate the polarization of light in each outgoing beam;
passing each divided outgoing beam through a Faraday single-mode fiber link in a magnetic field to rotate the polarization of light in each divided outgoing beam, whereby the polarization rotation occurring in the Faraday fiber link cancels the polarization rotation occurring in the polarization controller and the polarization states of light in the divided outgoing beams remain unchanged after having passed through the Faraday fiber links and the polarization controllers;
recombining the divided outgoing beams in a second polarization splitter into a single outgoing beam of randomly polarized light;
transmitting the recombined outgoing beam into the fiber optic link;
emitting an incoming beam of randomly polarized light from the fiber optic link;

dividing the incoming beam in the second polarization splitter into two incoming beams, one for each of two orthogonal, linearly polarized states of light;

passing each divided incoming beam through a polarization controller to rotate the polarization of light in each incoming beam;

passing each divided incoming beam through a Faraday single-mode fiber link in a magnetic field in a direction opposite that of the divided outgoing beams, to rotate the polarization of light in each divided incoming beam, whereby the polarization states of light in the divided incoming beams are completely reversed after having passed through the Faraday fiber links and the polarization controllers;

recombining the divided incoming beams in the first polarization splitter into a single incoming beam of randomly polarized light; and transmitting the recombined incoming beams into a fiber optic communication receiver.

23. An optical circulator, comprising;

a first pair of single-mode fiber links, each having a first end and a second end, wherein at least a portion of each of the first pair of single-mode fiber links is exposed to a magnetic field such that the first pair of single-mode fiber links impart a polarization rotation to light traversing the first pair of single-mode fiber links in a first direction, and a different rotation to light traversing the first pair of single-mode fiber links in a second, opposite direction;

a first polarization splitter having a first end joined to the first end of each of the first pair of single-mode fiber links, and a second end terminating in first and third fiber optic communication ports, respectively;

a pair of polarization controllers, each having a first port connected to the second end of each of the first pair of single-mode fiber links;

a second pair of single-mode fiber links, each having a first end joined to a second port of a different polarization controller; and a second polarization splitter having a first end joined to a second end of each of the second pair of single-mode fiber links; and a second end terminating in second and fourth fiber optic communication ports, respectively.

24. The optical circulator of claim 23, wherein the polarization rotation imparted to light traversing the first pair of single-mode fiber links in the first direction differs by 90° from the polarization rotation imparted to light traversing the first pair of single-mode fiber links in the opposite direction.

25. The optical circulator of claim 23, wherein each polarization controller imparts a polarization rotation to light traversing it, the polarization rotation imparted to light traversing the controller in a first direction being equal to the polarization rotation imparted to light traversing the controller in a second, opposite direction.

26. The optical circulator of claim 25, wherein the net polarization rotation imparted by each polarization controller and the single-mode fiber links joined thereto equals 45°.

27. The optical circulator of claim 23, wherein the single-mode fiber links, the polarization controllers, and the polarization splitters cooperate to reverse the linear polarization of light passing from the first polarization splitter to the second polarization splitter, and to leave unchanged the linear polarization of light passing from the second polarization splitter to the first polarization splitter.

28. The optical circulator of claim 23, further including a single, light-transmissive fiber link for fiber optic communication, wherein the single-mode fiber links and the polarization controllers cooperate to convey light transmitted into the first communication port to the second communication port, and further cooperate to convey light transmitted into the second communication port to the third communication port, whereby the optical circulator permits bi-directional fiber optic communication on the single fiber link.

29. A method for providing bidirectional communication to and from a single light-transmissive fiber optic link, which comprises the steps of:

emitting an outgoing beam of randomly polarized light from a fiber optic communication transmitter;

dividing the outgoing beam in a first polarization splitter into two outgoing beams, one for each of two orthogonal, linearly polarized states of light;

passing each divided outgoing beam through a polarization controller to rotate the polarization of light in each outgoing beam;

passing each divided outgoing beam through a single-mode fiber link outside of a magnetic field;

passing each divided outgoing beam through a single-mode fiber link in the magnetic field to rotate the polarization of light in each divided outgoing beam, whereby the polarization rotation occurring in the single-mode fiber link in the magnetic field cancels the polarization rotation occurring in the polarization controller and in the single-mode fiber link outside the magnetic field and the polarization states of light in the divided outgoing beams remain unchanged after having passed through the fiber links in and outside of the magnetic field and the polarization controllers;

recombining the divided outgoing beams in a second polarization splitter into a single outgoing beam of randomly polarized light;

transmitting the recombined outgoing beam into the fiber optic link;

emitting an incoming beam of randomly polarized light from the fiber optic link;

dividing the incoming beam in the second polarization splitter into two incoming beams, one for each of two orthogonal, linearly polarized states of light;

passing each divided incoming beam through a polarization controller to rotate the polarization of light in each incoming beam;

passing each divided incoming beam through a single-mode fiber link outside of the magnetic field;

passing each divided incoming beam through a single-mode fiber link in the magnetic field in a direction opposite that of the divided outgoing beams, to rotate the polarization of light in each divided incoming beam, whereby the polarization states of light in the divided incoming beams are completely reversed after having passed through the fiber links in and outside of the magnetic field and the polarization controllers;

recombining the divided incoming beams in the first polarization splitter into a single incoming beam of randomly polarized light; and transmitting the recombined incoming beams into a fiber optic communication receiver.

* * * * *

UNITED STATES PATENT AND TRADEMARK OFFICE
CERTIFICATE OF CORRECTION

PATENT NO. : 5,400,418
DATED : March 21, 1995
INVENTOR(S) : Gary W. Pearson, Jerzy S. Kransinski, Philip E. Baker It is certified that error appears in the above-indentified patent and that said Letters Patent is hereby corrected as shown below:

On the title page: Item [75]

Inventors should read as follows:

Inventors:     Gary W. Pearson; Jerzy S. Krasinski, both of Stillwater; Phillip E. Baker, Tulsa, all of Okla.

Signed and Sealed this

Twenty-eighth Day of May, 1996

Attest:

BRUCE LEHMAN

*Attesting Officer*            *Commissioner of Patents and Trademarks*